(12) United States Patent
Wouters et al.

(10) Patent No.: US 10,866,092 B2
(45) Date of Patent: Dec. 15, 2020

(54) CHROMATIC CONFOCAL AREA SENSOR

(71) Applicant: KLA-TENCOR CORPORATION, Milpitas, CA (US)

(72) Inventors: Christophe Wouters, Balen (BE); Kristof Joris, Herk-de-Stad (BE); Johan De Greeve, Brabant (BE)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/513,091

(22) Filed: Jul. 16, 2019

(65) Prior Publication Data

US 2020/0033121 A1 Jan. 30, 2020

Related U.S. Application Data

(60) Provisional application No. 62/702,894, filed on Jul. 24, 2018.

(51) Int. Cl.
*G01B 11/28* (2006.01)
(52) U.S. Cl.
CPC .......... *G01B 11/28* (2013.01); *G01B 2210/50* (2013.01); *G01B 2210/56* (2013.01)
(58) Field of Classification Search
CPC .... G01B 11/24; G01B 11/28; G01B 2210/50; G01B 2210/56
See application file for complete search history.

(56) References Cited

U.S. PATENT DOCUMENTS

| | | | |
|---|---|---|---|
| 5,248,876 A | 9/1993 | Kerstens et al. | |
| 7,504,642 B2* | 3/2009 | Hummel | G01N 21/6489 |
| | | | 250/400 |
| 8,451,457 B2 | 5/2013 | Gates et al. | |
| 2012/0033066 A1* | 2/2012 | Wieser | G01B 11/0608 |
| | | | 348/87 |
| 2015/0054937 A1* | 2/2015 | Lippert | G02B 21/0028 |
| | | | 348/80 |
| 2015/0090908 A1 | 4/2015 | Lippert et al. | |
| 2016/0334613 A1* | 11/2016 | Ishiwata | G02B 21/361 |

(Continued)

FOREIGN PATENT DOCUMENTS

| | | |
|---|---|---|
| JP | 2006133499 A | 5/2006 |
| KR | 20010090718 A | 10/2001 |

OTHER PUBLICATIONS

Tiziani et al., Theoretical Analysis of Confocal Microscopy with Microlenses, Applied Optics, Jan. 1996, vol. 35, No. 1, pp. 120-125.

(Continued)

*Primary Examiner* — Steven Whitesell Gordon
(74) *Attorney, Agent, or Firm* — Hodgson Russ LLP

(57) ABSTRACT

3D measurements of features on a workpiece, such as ball height, co-planarity, component thickness, or warpage, are determined. The system includes a broadband light source, a microlens array, a tunable color filter, a lens system, and a detector. The microlens array can focus a light beam to points in a focal plane of the microlens array. The tunable color filter can narrow the light beam to a band at a central wavelength. The lens system can provide longitudinal chromatic aberration whereby different wavelengths are imaged at different distances from the lens system.

18 Claims, 9 Drawing Sheets

(56) References Cited

U.S. PATENT DOCUMENTS

2016/0377412 A1* 12/2016 Li .................... G01B 11/0641
356/630
2019/0101489 A1* 4/2019 Darwin ................. G01N 21/31

OTHER PUBLICATIONS

Hillenbrand et al., Chromatic Confocal Matrix Sensor with Actuated Pinhole Arrays, Applied Optics, May 20, 2015, vol. 54, No. 15, pp. 4927-4936.
Stil SAS, "Mesure de distance et d'epaisseur," retrieved from http://technology.stil-sensors.com/EN/slide2.jpg, Apr. 6, 2018, Stil SAS, Aix-en-Provence, France.
WIPO, ISR for PCT/US2019/042897, dated Nov. 8, 2019.

\* cited by examiner

CHROMATIC CONFOCAL AREA SENSOR

CROSS-REFERENCE TO RELATED APPLICATIONS

This application claims priority to the provisional patent application filed Jul. 24, 2018 and assigned U.S. App. No. 62/702,894, the disclosure of which is hereby incorporated by reference.

FIELD OF THE DISCLOSURE

This disclosure relates to 3D measurement systems.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Inspection systems can be used on the back end of semiconductor manufacturing. Inspection of finished packages can include measuring, for example, component thickness, coplanarity of ball grid arrays (BGAs), height of integrated passive devices (IPDs), or tilt angle of leads on leaded devices. 3D inspection is becoming more important because of developments in the package industry, such as stacking devices.

Many semiconductor devices include 3D surfaces or features. 3D surfaces or features have been measured using chromatic confocal systems, but such systems are slow or have high operation costs. Confocal point and line sensors typically require some mechanical movement during the height measurement. Mechanical movement is generally slow and can lead to vibrations that reduce the accuracy of the measurements.

For example, a chromatic confocal point sensor has been used. Light from a broadband point source is directed at a workpiece through an optical system with an axial chromatic aberration. As a result, different wavelengths will be focused at different distances from the optical system. The light reflects on the workpiece under test back into the optical system. The reflected light then travels towards a pinhole which acts as a spatial filter. Wavelengths that are out of focus on the object under test will be blocked by the pinhole. Only the wavelength which is in focus can pass. A spectrometer collects the light which passes the pinhole. Based on the measured wavelength the distance from the optical system to the object under test can be determined. A system with the chromatic confocal point sensor requires a translation of the object under test in X and Y directions, which increases complexity, reduces throughput, and reduces accuracy.

In another example of the chromatic confocal line sensor, the point source is replaced by a line source and the pinhole is replaced by a slit. The spectrometer is a 2D sensor. One axis is used to determine the position on the line. The other axis is used to determine the wavelength. In this example, individual points of the line are measured in parallel. A system with the line source and slit still requires a translation of the object in one direction, which presents the same drawbacks as with a confocal point sensor.

In yet another example of the chromatic confocal, the point source is replaced by an array of point sources and the pinhole is replaced by an array of pinholes. The spectrometer analyzes three dimensions: x-location, y-location, and wavelength. An arrangement is required to multiplex these three dimensions on the 2D sensor in the spectrometer. A system with an array of point sources and pinholes may not require mechanical movement during the height measurement. In this case X, Y, and wavelength are measured in a single shot. However, the 3D data is multiplexed on a 2D sensor. Consequently, compromises are made on the resolution. Increasing XY resolution will decrease Z resolution and vice versa. Such a compromise can be insufficient for large-scale semiconductor manufacturing or can impact the accuracy of measurements.

In another example, a galvo mirror is used such that the projected point from the chromatic confocal point sensor is swept over the workpiece under test to make a chromatic confocal line sensor. Individual points of the line are measured in series. A system with the galvo mirror requires a translation of the object in one direction while the galvo mirror is scanning in the other direction. This, like other previous designs, increases complexity, reduces throughput, and reduces accuracy.

A chromatic confocal area sensor also can be made by combining a chromatic confocal line sensor with a galvo mirror. This way the line is swept over the workpiece. Individual lines from the scanned area are measured in series. With a system combining the confocal line sensor and galvo mirror, the object is steady while a galvo mirror is scanning a line over the object. Compared to an area scan system, the integration time of the image acquisition is smaller for a galvo mirror system. This can place stringent requirements on the output level of the light source.

Confocal sensors which are not based on chromatic aberration also require scanning in Z-direction to be able to do a full 3D reconstruction of the object under test. This can be done by translating the object in Z-direction or by translating the pinholes in Z-direction. However, this still requires translation of the object or microlens in a Z-direction.

Therefore, an improved 3D measurement system is needed.

BRIEF SUMMARY OF THE DISCLOSURE

A system is provided in a first embodiment. The system comprises a broadband light source that generates a light beam; a stage configured to hold a workpiece; a microlens array positioned in a path of the light beam; a tunable color filter positioned in the path of the light beam; a lens system positioned to image the plurality of points onto the workpiece using the light beam; and a detector positioned to receive the light beam from the workpiece on the stage. The microlens array focuses the light beam to a plurality of points in a focal plane of the microlens array. The microlens array also is configured as a spatial filter for the light beam that is reflected from the workpiece on the stage thereby only passing the light beam that is in focus at the workpiece on the stage. The tunable color filter is configured to narrow the light beam to a band at a central wavelength. The lens system is configured to provide longitudinal chromatic aberration whereby different wavelengths are imaged at different distances from the lens system. The light beam reflected from the workpiece on the stage is directed through the microlens array before being received by the detector.

The system can further include a collimating lens positioned in the path of the light beam between the tunable color filter and the microlens array. The collimating lens can be configured to collimate the light beam and direct the light beam at the microlens array. In an instance, the tunable color filter is disposed between the microlens array and the lens system along the path of the light beam.

The detector can be a greyscale area scan camera.

The lens system can be an objective lens.

The system can further include a beam splitter positioned in the path of the light beam between the tunable color filter and the lens system.

The system can further include a tube lens positioned in the path of the light beam between the microlens array and the lens system.

The tunable color filter can be disposed between the broadband light source and the microlens array.

The tunable color filter can be disposed between the microlens array and the detector.

A plurality of the tunable color filters can be positioned in the path of the light beam.

The tunable color filter can be a liquid crystal tunable filter, an acousto optical tunable filter, or a tunable Fabry Perot etalon.

The system can further include a processor in electronic communication with the detector. The processor can be configured to determine 3D measurements of features on the workpiece.

A method is provided in a second embodiment. A light beam is generated using a broadband light source. Using a microlens array, the light beam is focused into a plurality of points in a focal plane of the microlens array. The microlens array is configured as a spatial filter. The light beam is narrowed to a band at a central wavelength using a tunable color filter. A plurality of points are imaged onto a workpiece using a lens system. The lens system is configured to provide longitudinal chromatic aberration whereby different wavelengths are imaged at different distances from the lens system. The light beam reflected from the workpiece that is in focus at the workpiece using the microlens array is passed. The light beam reflected from the workpiece is received at a detector.

The method can further include determining 3D measurements of features on the workpiece using a processor. In an instance, the method further includes sweeping a narrow band from a low wavelength to a high wavelength and determining a topography of the workpiece using the processor. In an instance, the 3D measurements include one or more of ball height, co-planarity, component thickness, and warpage. In an instance, the method further includes skipping part of the workpiece during the determining.

Only one or more features from the workpiece located at a selected Z-level may be detected by the detector.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can be used to do 3D measurements on a workpiece, which can include electronic components or other objects under test. 3D measurements can include ball height, co-planarity, component thickness, warpage, or other measurements.

High resolution (in both XY and Z directions) 3D reconstruction of objects can be achieved. Scalability using the embodiments disclosed herein is better than previous solutions because XY and Z resolution are independent of each other. There is no mechanical movement involved, which eliminates vibrations. This provided improved accuracy and repeatability. Parts of the measuring range that are of no interest can be skipped, which provides faster results.

Figure 1:
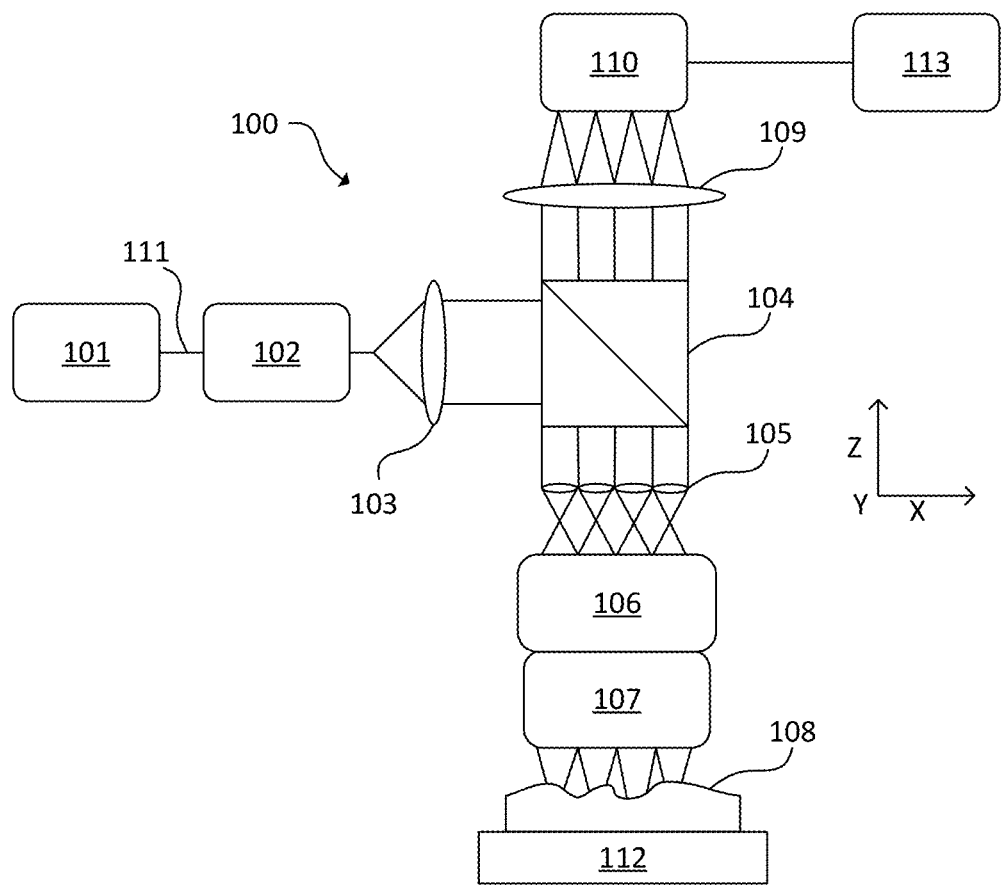
FIG. 1 is a diagram of a first embodiment of a system in accordance with the present disclosure.
Figure 2:
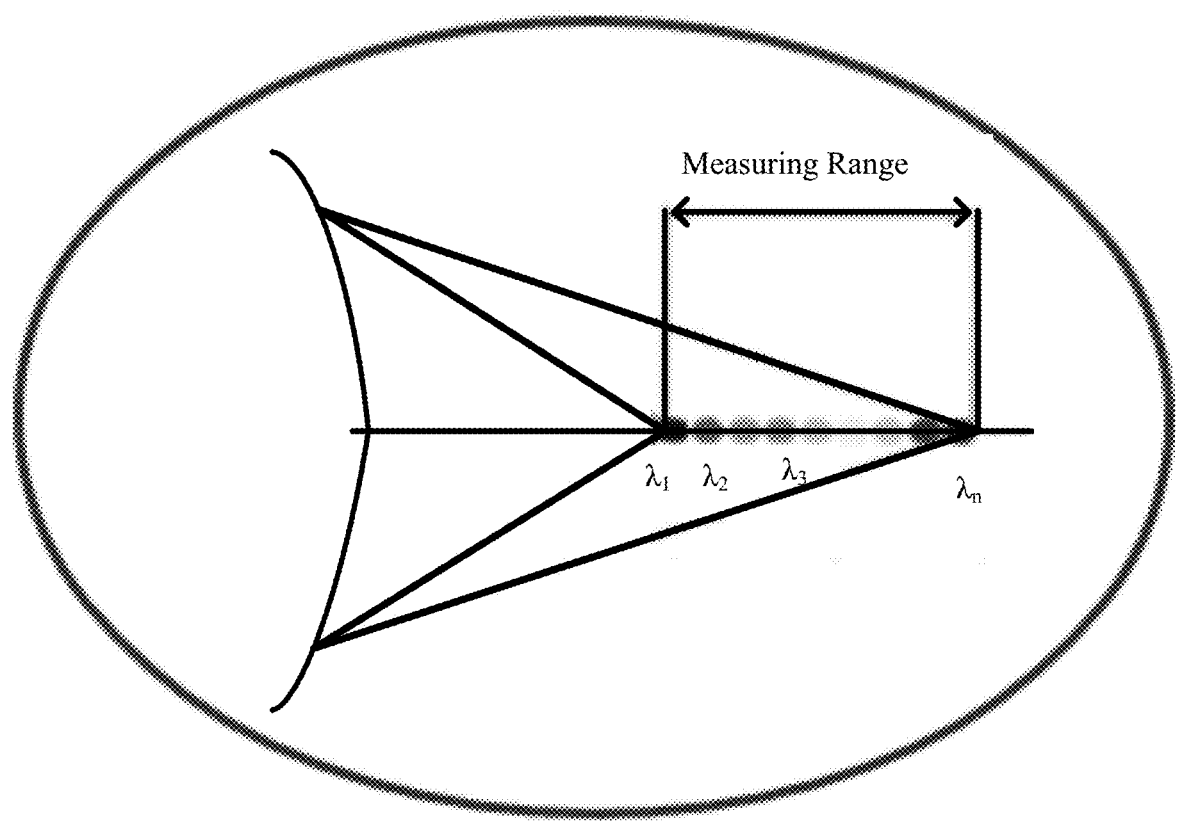
FIG. 2 is a diagram of the measuring range using the system of FIG. 1.

FIG. 1 is a diagram of a first embodiment of a system 100 and FIG. 2 is a diagram of the measuring range using the system 100. Mechanical scanning of the workpiece 108 in the Z-direction is eliminated. The system 100 uses a tunable color filter to scan through the measuring range without mechanical movement. The system 100 has a capability to split the measuring range in regions of interest and skip the parts where no relevant data likely can be found. The system 100 can enable optimized sampling of the confocal curve by using real-time algorithms to determine the confocal curve shape. This can allow for faster scanning which can provide faster metrology.

As shown in FIG. 2, the lenses 106 and 107 are designed so that the focal length of the lens is a function of the wavelength. Each dot in FIG. 2 corresponds to a certain wavelength band selected by the tunable color filter. By changing the wavelength band from $\lambda_1$ to $\lambda_n$, the measuring range can be scanned to detect at which position the object is located.

Turning back to FIG. 1, the system 100 has a broadband light source 101 that generates a light beam 111. The wavelength of the broadband light source 101 can be detected by the detector 110. The wavelength can be visible light, near-infrared, short-wave infrared, ultraviolet, or other wavelengths.

A stage 112 is configured to hold a workpiece 108. In an instance, the workpiece 108 and/or stage 112 are fixed and do not move. The workpiece 108 may be a semiconductor wafer or semiconductor package.

A tunable color filter 102 is positioned in the path of the light beam 111. The tunable color filter 102 is configured to narrow the light beam 111 to a band at a central wavelength. The tunable color filter 102 may be a liquid crystal tunable filter, an acousto optical tunable filter, or a tunable Fabry Perot etalon. The tunable color filter 102 also can include a polarizer, such as with the liquid crystals. A motorized filter wheel or other mechanism to change between different optical filters also may be used. The tunable color filter 102 may be bandpass for one or multiple wavebands.

In an instance, the tunable color filter 102 has a bandwidth that is approximately equal to a width of a confocal curve.

In an instance, the tunable color filter 102 can be positioned in the path of the light beam 111 between the broadband light source 101 and the microlens array 105 or beam splitter 104. In another instance, the tunable color filter 102 can be disposed in the path of the light beam 111 between the microlens array 105 and the detector 110. In another particular embodiment, a plurality of the tunable color filter 102 are positioned in a path of the light beam 111 at one or more locations along a path of the light beam 111.

A collimating lens 103 is positioned in the path of the light beam 111 between the tunable color filter 102 or broadband light source 101 and a microlens array 105. The collimating lens 103 is configured to change the light beam 111 to be collimated and directed at the microlens array 105.

A beam splitter 104 can be positioned in the path of the light beam 111 between the tunable color filter 102 and the microlens array 105 or the lens system 107.

A microlens array 105 is positioned in a path of the light beam 111. The accuracy of the system 100 may depend on the numerical aperture (NA) of the microlens array 105. The pitch between the microlenses of the microlens array 105 can affect the lateral sampling resolution and the amount of crosstalk. The microlens array 105 focuses the light beam 111 to a plurality of points in a focal plane of the microlens array 105. The microlens array 105 is configured as a spatial filter for the light beam 111 that is reflected from the workpiece 108 on the stage 112 thereby only passing the light beam 111 that is in focus at the workpiece 108 on the stage 112.

A lens system 107 is positioned in a path of the light beam 111 to image the plurality of points onto the workpiece 108 using the light beam 111. For example, the lens system 107 may be an objective lens. The lens system 107 is configured to provide longitudinal chromatic aberration whereby different wavelengths are imaged at different distances from the lens system 107. The chromatic aberration can be induced by refraction, diffraction, or a combination of both refraction and diffraction.

A tube lens 106 can be positioned in a path of the light beam 111 between the microlens array 105 or beam splitter 104 and the lens system 107. In an instance, the tube lens 106 is diffractive with chromatic aberration.

The light beam 111 reflected from the workpiece 108 on the stage 112 can be directed through the microlens array 105 before being received by the detector 110.

An imaging lens 109 is positioned in a path of the light beam between the beam splitter 104 and a detector 110. The imaging lens 109 can image the microlens array 105 onto the detector 110.

Figure 9:
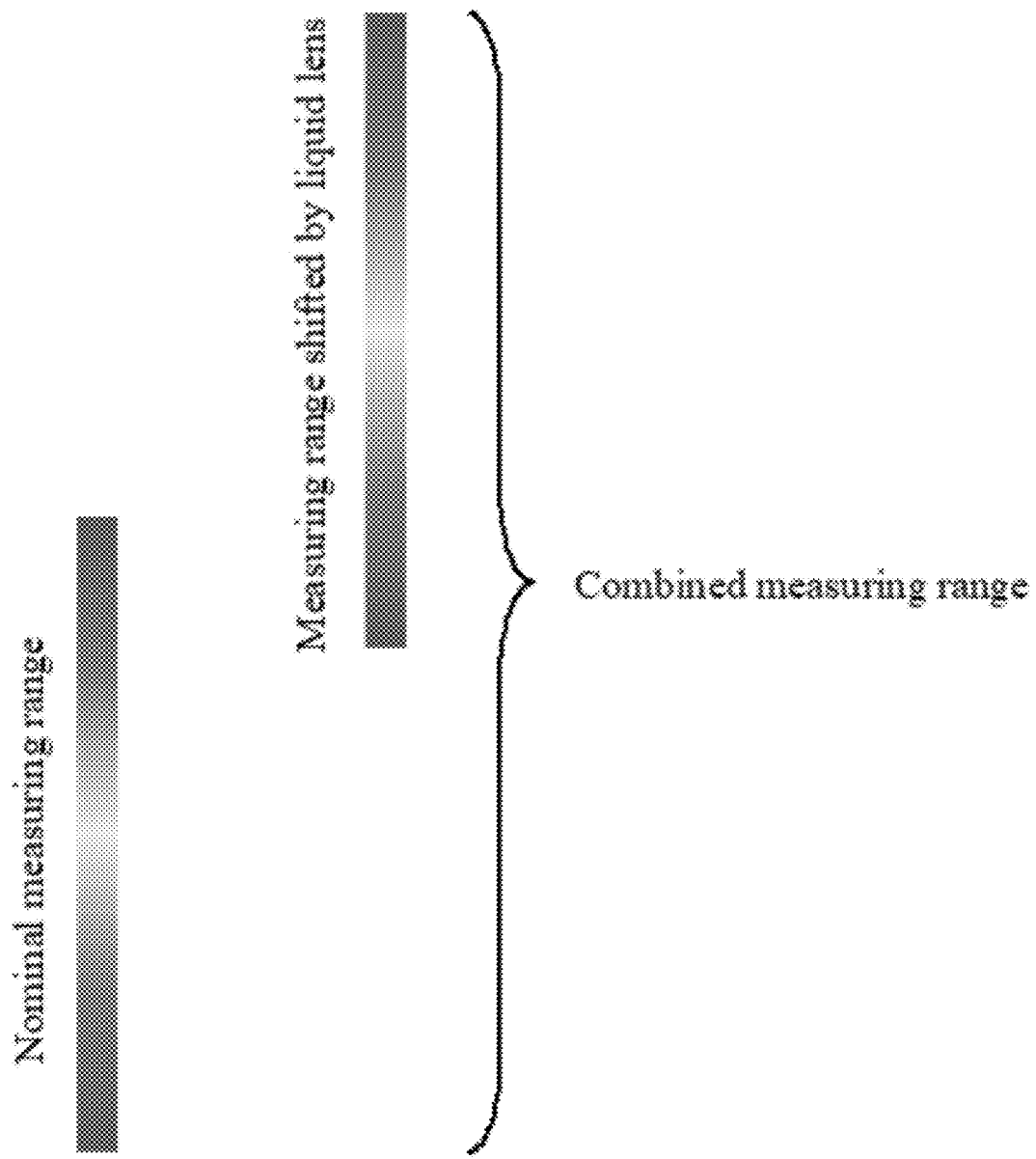
FIG. 9 illustrates a combined measuring range.

An optional focus tunable lens can be used in the system 100 and may be positioned in a path of the light beam between the tube lens 106 and the lens system 107. By introducing a focus tunable lens into system 100, the measuring range can be shifted in Z-direction without mechanical movement. This can be used to extend the Z-range. An electrically tunable liquid lens is an example for a focus tunable lens. FIG. 9 illustrates a combined measuring range.

A detector 110 is positioned to receive the light beam 111 from the workpiece 108 on the stage 112. The detector 110 may be a greyscale area scan camera or other types of devices. The detector 110 may measure intensity.

A processor 113 can be in electronic communication with the detector 110. The processor 113 can be configured to determine 3D measurements of features on the workpiece 108. The processor 113, other system(s), or other subsystem(s) described herein may be part of various systems, including a personal computer system, image computer, mainframe computer system, workstation, network appliance, internet appliance, or other device.

The processor 113 may be disposed in or otherwise part of the system 100 or another device. In an example, the processor 113 may be part of a standalone control unit or in a centralized quality control unit. Multiple processors 113 may be used.

The processor 113 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 113 to implement various methods and functions may be stored in readable storage media, such as a memory in an electronic data storage unit in electronic communication with the processor 113.

The processor 113 may be configured to perform a number of functions using the output of the system 100 or other output. For instance, the processor 113 may be configured to send the output to an electronic data storage unit. The processor 113 may be further configured as described herein.

The processor 113 may be configured according to any of the embodiments described herein. The processor 113 also may be configured to perform other functions or additional steps using the output of the system 100 or using images or data from other sources.

The processor 113 may be communicatively coupled to any of the various components or sub-systems of system 100 in any manner known in the art. Moreover, the processor 113 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 113 and other subsystems of the system 100 or systems external to system 100.

Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 113 or, alternatively, multiple processors 113. Moreover, different subsystems of the system 100 may include one or more computing or logic systems. Therefore, the above description should not be interpreted as a limitation on the present disclosure but merely an illustration.

In an instance, the light beam 111 from the broadband light source 101 is sent through a collimating lens 103. The light beam 111 that is collimated impinges on microlens array 105, which focuses the light beam 111 to a plurality of points in the focal plane of the microlens array 105. The plurality of points is imaged by a lens system 107 onto the workpiece 108. Because of longitudinal chromatic aberration in the lens system 107, different wavelengths will be imaged at different distances from the lens system 107.

Instead of using the complete bandwidth of the broadband light source 101, the system 100 uses a tunable color filter 102 in the illumination path of the light beam 111. This tunable color filter 102 can allow the passage of only a narrow band at a selected central wavelength. At the object side this can correspond to selecting a single Z-level within the measuring range.

The light beam 111 reflects on the workpiece 108 and travels back through the lens system 107 towards the microlens array 105. The microlens array 105 now acts as a spatial filter and only passes the light beam 111 which is in focus at the workpiece 108. So only points from the workpiece 108 which are located at the selected Z-level result in a signal on the detector 110.

By sweeping the narrow band from low wavelength to high wavelength, the system 100 can scan through a complete measuring range and reconstruct the complete topography of the workpiece 108.

Operation is not limited to a single range of wavelengths. The used wavelength range can be chosen as required by the object under test. For example, objects with good reflection can use visible light, low wavelength can be at 450 nm, and high wavelength can be at 650 nm. How the bandpass changes may depend on the type of tunable color filter.

No mechanical movement may be needed during the measurement using the system 100. XY-direction movement is not needed since the system is based on a microlens array 105 and captures a large rectangular area at once. Scanning in the Z-direction is done by changing the bandpass from the tunable color filter 102. Because there is no mechanical movement, the system 100 is free from vibrations and has improved throughput compared to previous systems. Switching between wavelengths can be done within microseconds or milliseconds depending on the type of tunable color filter 102.

Figure 3:
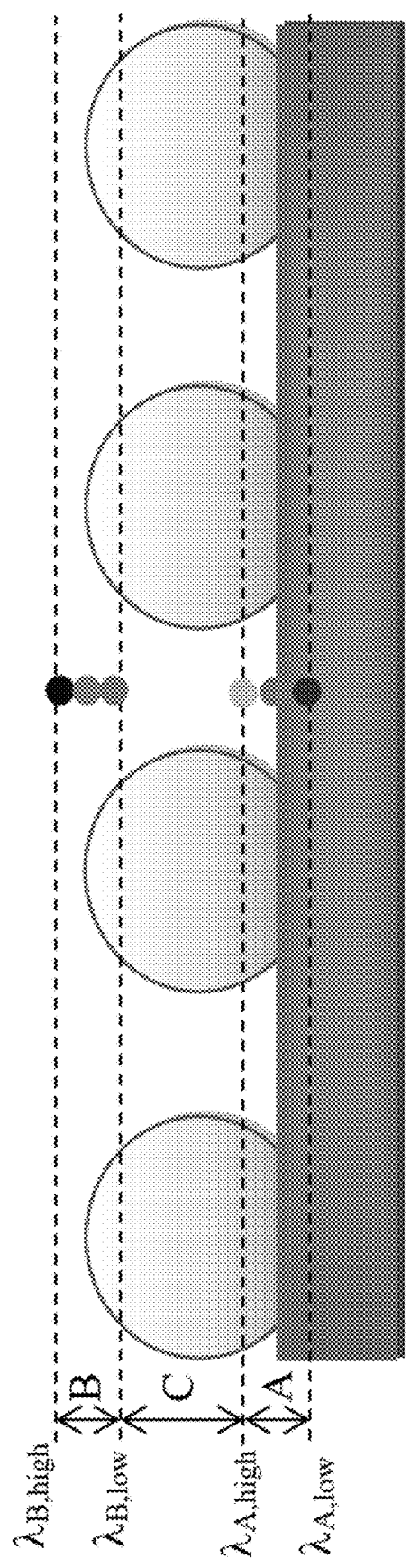
FIG. 3 illustrates measurements on an exemplary workpiece.

It is possible to skip certain parts of the measuring range. FIG. 3 illustrates measurements on an exemplary workpiece. For example, the ball height on a ball grid array in FIG. 3 can be measured. In FIG. 3, the dots in the measuring range indicate the color set by the tunable color filter and the resulting focus points. This shows that multiple scan points are being used in range A and B. There are no scan points in range C since the tunable filter immediately changes the color from $\lambda_{A,high}$ to $\lambda_{B,low}$.

A range A around the substrate and a range B around the ball top can be selected based on the nominal ball height. The range C between A and B (i.e., between $\lambda_{A,high}$ and $\lambda_{B,low}$) has no relevant data and can be skipped. The tunable color filter can change the wavelength in small steps. Then the wavelength can be changed from $\lambda_{A,high}$ to $\lambda_{B,low}$. Then small steps may be used again to go from $\lambda_{B,low}$ to $\lambda_{B,high}$.

Previous systems with a mechanical Z-scan could not skip part of the measuring range because the object or microlens array has to move physically from one location to the other. So in case of a mechanical scan range C has to be scanned anyway. The system 100 provides faster measurement of the relevant data by jumping from range A to range B.

A grayscale area scan camera may be used as the detector 110. A wavelength is selected with the tunable color filter 102. XY resolution and Z resolution are independent of each other because there are no multiplexed signals. Interdependent XY resolution and Z resolution also becomes clear, as seen with the example of the ball height measurement in FIG. 3.

In previous chromatic confocal systems, each sampling point on the object a line of pixels is reserved on the sensor to measure the wavelength. The amount of pixels in each line was a compromise between XY resolution and Z resolution. Longer lines give better Z resolution but worse XY resolution and vice versa. The wavelength measurement covers the full range $\lambda_{A,low}$ to $\lambda_{B,high}$ but the pixels assigned to measure the wavelengths $\lambda_{A,high}$ to $\lambda_{B,low}$ are useless in this instance. Expensive high resolution cameras may be used to get sufficient XY and Z resolution, but many of the pixels are not used. This also creates overhead when processing the data. Even though the pixels contain no useful information, the pixels are still processed.

Figure 4:
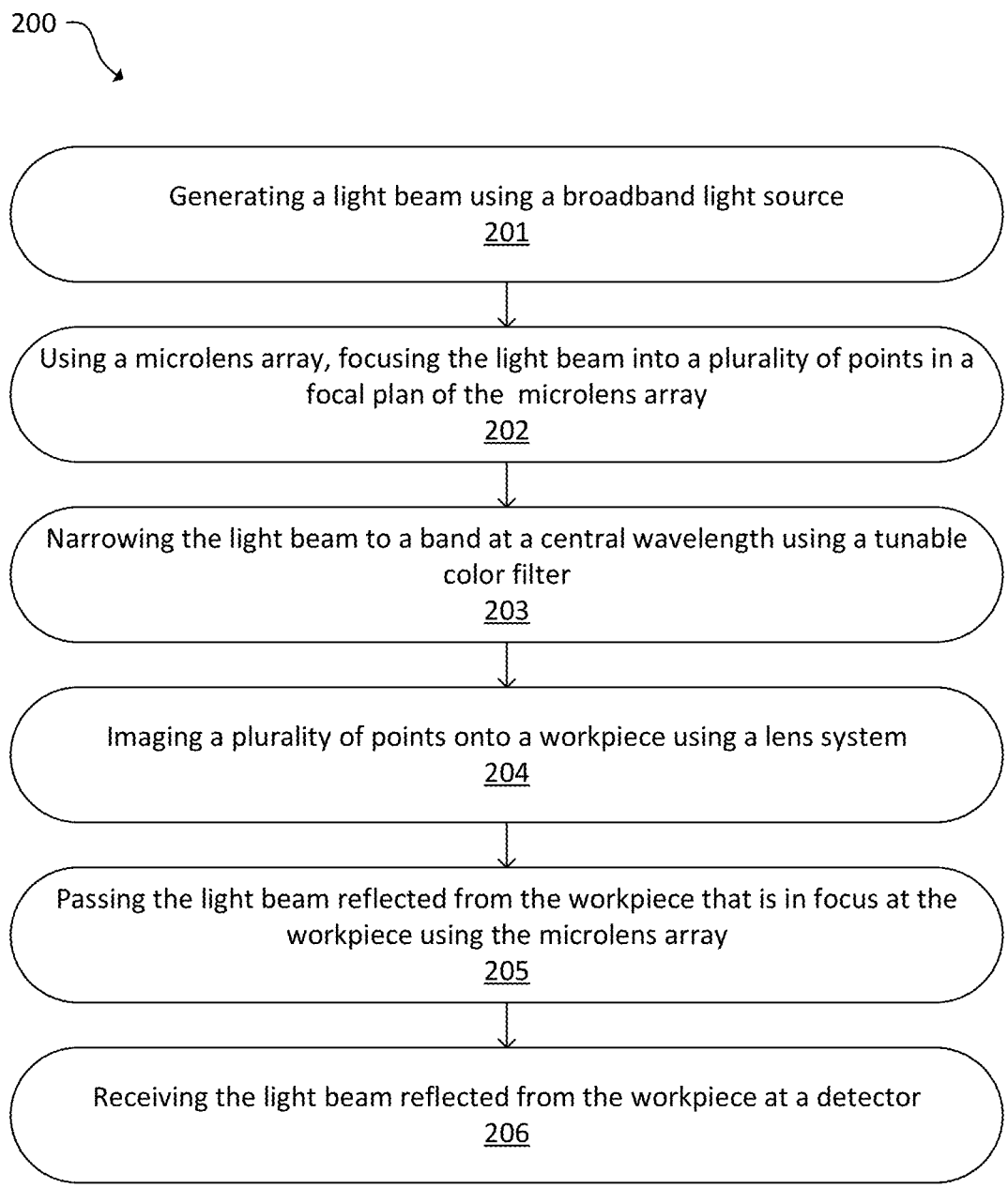
FIG. 4 is a flowchart of a method in accordance with the present disclosure.

FIG. 4 is a flowchart of a method 200. At 201, a light beam is generated using a broadband light source. The light be is focused, using a microlens array, into a plurality of points in a focal plan of the microlens array at 202. The microlens array is configured as a spatial filter. At 203, the light beam is narrowed to a band at a central wavelength using a tunable color filter. A plurality of points are imaged onto a workpiece using a lens system at 204. The lens system is configured to provide longitudinal chromatic aberration whereby different wavelengths are imaged at different distances from the lens system. At 205, the light beam reflected from the workpiece that is in focus at the workpiece is passed using the microlens array. The light beam reflected from the workpiece is received at a detector at 206.

The method 200 can further include determining 3D measurements of features on the workpiece using a processor. The 3D measurements can include one or more of ball height, co-planarity, component thickness, and warpage. In an instance, the method 200 further includes sweeping a narrow band from a low wavelength to a high wavelength and determining a topography of the workpiece using the processor.

The light beam can be collimated before the focusing using the microlens array.

Only one or more features from the workpiece located at a selected Z-level may be detected by the detector. As mentioned with respect to FIG. 3, part of a range on the workpiece can be skipped using method 200.

While illustrated in FIG. 1 with the tunable color filter 102 between the broadband light source 101 and the collimating lens 103 with respect to a path of the light beam 111, the tunable color filter 102 can be positioned elsewhere in the system 100. For example, the tunable color filter 102 can be disposed between the microlens array 105 and the lens system 107 along the path of the light beam 111.

Figure 5:
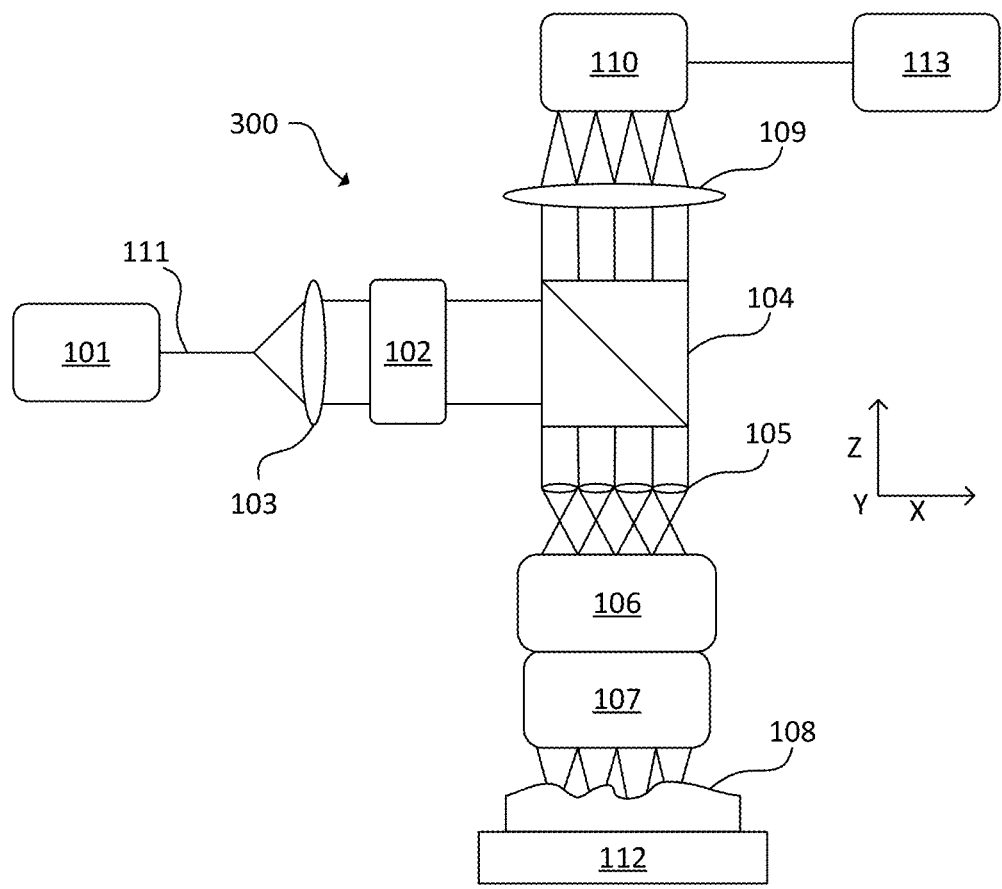
FIGS. 5-8 are diagrams of other embodiments of a system in accordance with the present disclosure.
Figure 6:
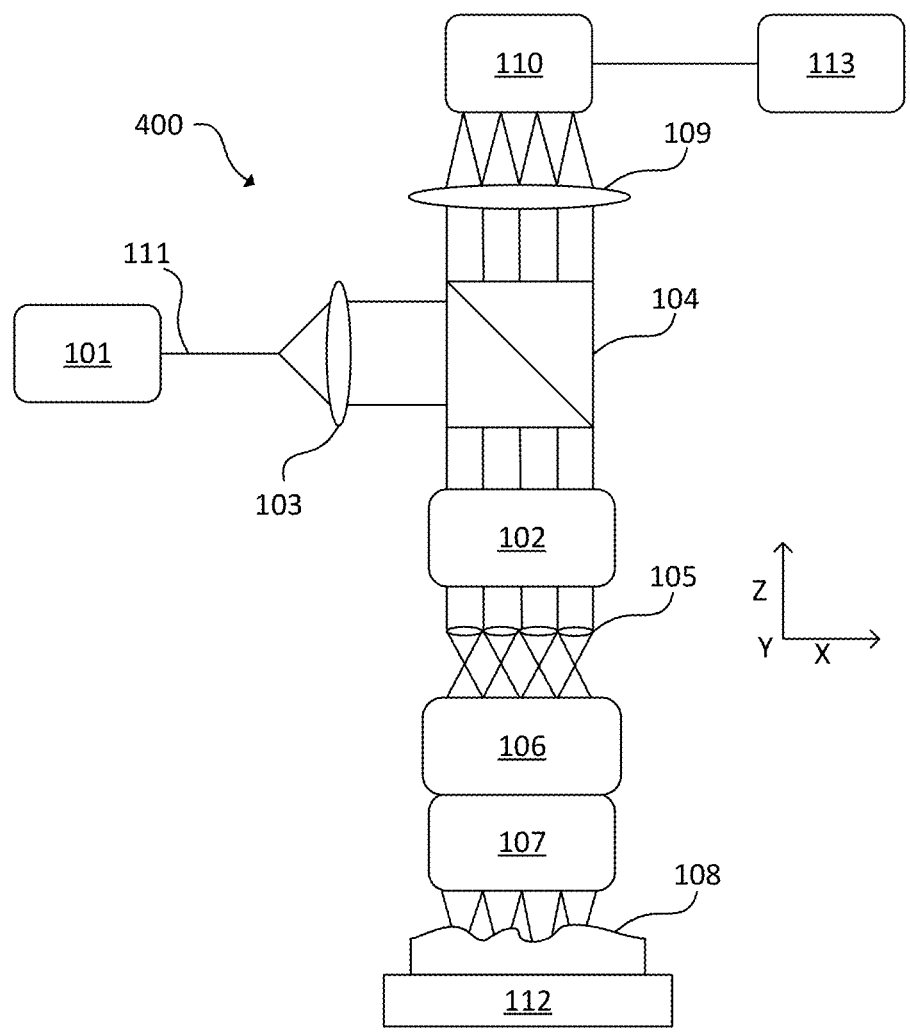
Figure 7:
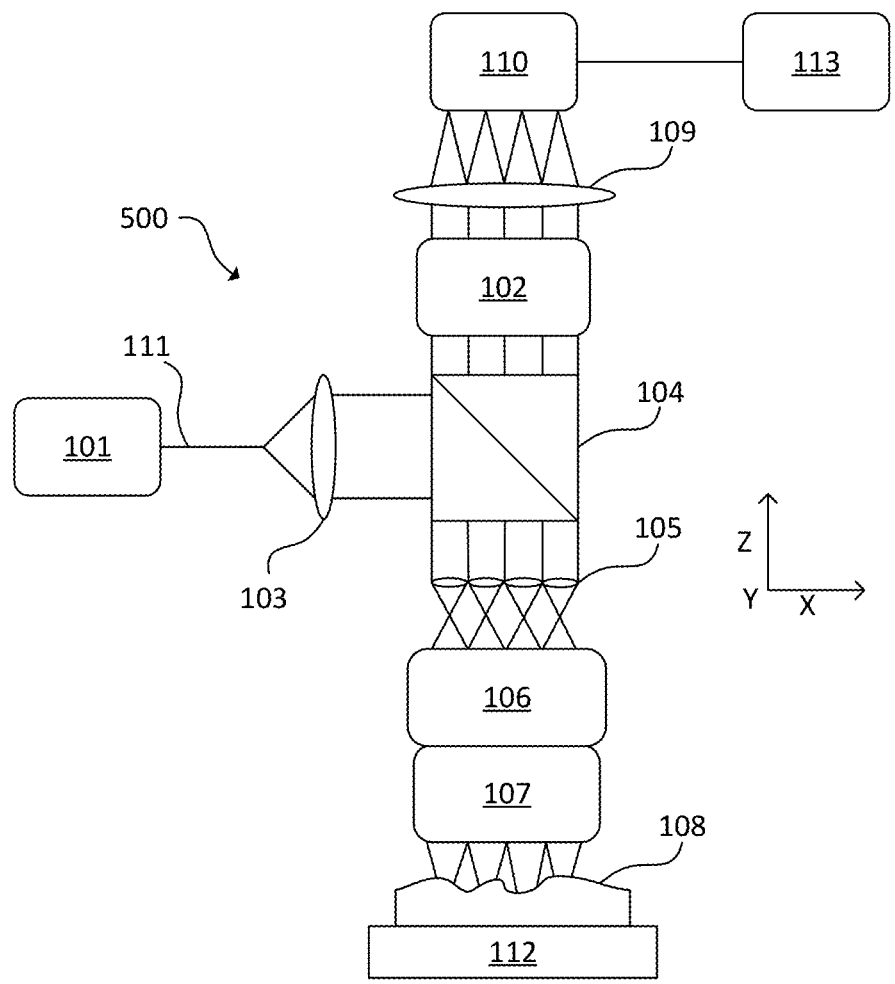
Figure 8:
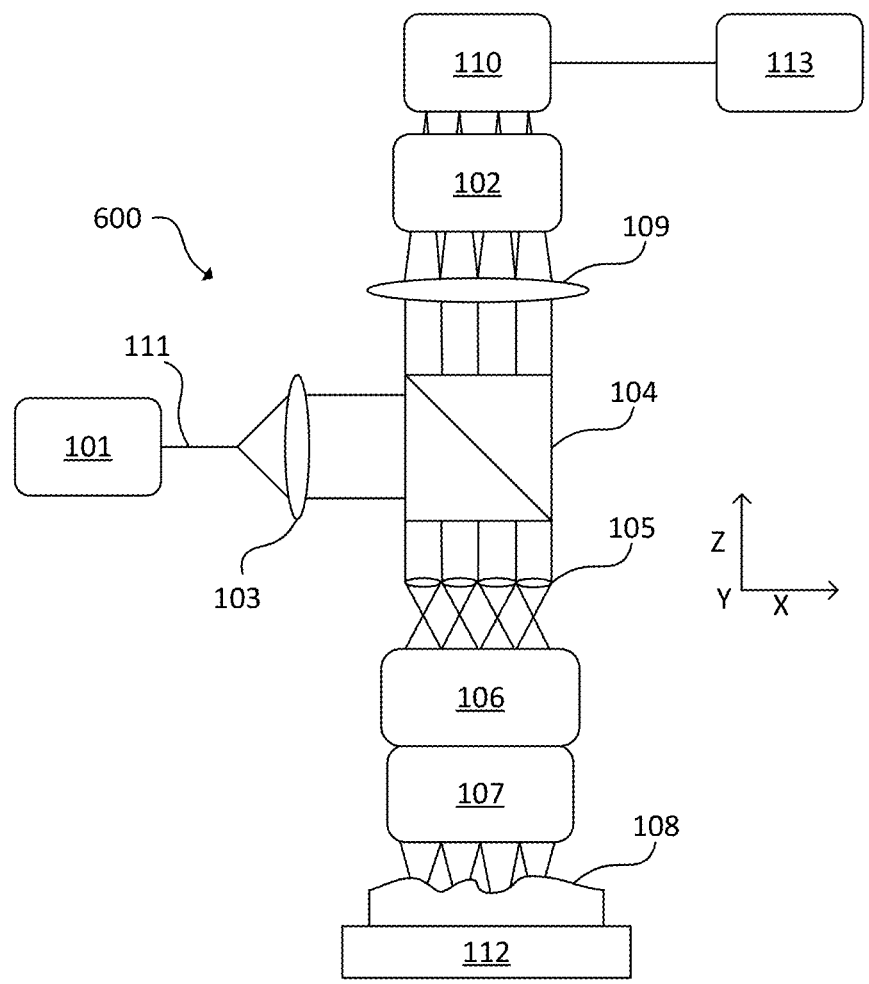

FIGS. 5-8 are diagrams of other embodiments of a system in accordance with the present disclosure. These other embodiments can affect the overall size or space requirements of the system. The tunable color filter 102 can be positioned in front of the detector 110 at other places in the optical path. This does not change the functionality of the system. In FIG. 5, the system 300 positions the tunable color filter 102 in the path of the light beam 111 between the collimating lens 103 and the beam splitter 104. In FIG. 6, the system 400 positions the tunable color filter 102 in the path of the light beam 111 between the beam splitter 104 and the microlens array 105. In FIG. 7, the system 500 positions the tunable color filter 102 in the path of the light beam 111 between the beam splitter 104 and the imaging lens 109. In FIG. 8, the system 600 positions the tunable color filter 102 in the path of the light beam 111 between the imaging lens 109 and the detector 110.

More than one tunable color filter 102 also may be used at multiple locations in the optical path in order to improve and/or narrow bandwidth. Thus, the system can include two or more tunable color filters 102 at locations shown in FIG. 1 or FIGS. 5-8. By using two color filters the bandwidth of the passband can be reduced. A smaller bandwidth may result in a more accurate Z measurement. To reduce the bandwidth, the passband of a first filter and the passband of a second filter can overlap while having different central wavelengths. For example, the first filter can have a bandwidth of 10 nm and centered at 500 nm while the second filter can have a bandwidth of 10 nm centered at 505 nm. The combination of both filters can have a bandwidth of 5 nm centered at 502.5 nm.

In an embodiment, a Ronchi ruling can be used instead of the microlens array 105. The Ronchi ruling is a group of parallel slits. If the system is based on the microlens array 105 it can behave like point sensors running in parallel. If the system is based on a Ronchi ruling it can behave like line sensors running in parallel. While a slightly wider confocal curve may occur, the Ronchi ruling can lower cost.

In another embodiment, a pinhole array can be used instead of a microlens array 105.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
    a broadband light source that generates a light beam;
    a stage configured to hold a workpiece;
    a microlens array positioned in a path of the light beam, wherein the microlens array focuses the light beam to a plurality of points in a focal plane of the microlens array, and wherein the microlens array is configured as a spatial filter for the light beam that is reflected from the workpiece on the stage thereby only passing the light beam that is in focus at the workpiece on the stage;
    a tunable color filter positioned in the path of the light beam, wherein the tunable color filter is configured to narrow the light beam to a band at a central wavelength;
    a lens system positioned to image the plurality of points onto the workpiece using the light beam, wherein the lens system is configured to provide longitudinal chromatic aberration whereby different wavelengths are imaged at different distances from the lens system; and
    a detector positioned to receive the light beam from the workpiece on the stage, wherein the light beam reflected from the workpiece on the stage is directed through the microlens array before being received by the detector.

2. The system of claim 1, further comprising a collimating lens positioned in the path of the light beam between the tunable color filter and the microlens array, wherein the collimating lens is configured to collimate the light beam and direct the light beam at the microlens array.

3. The system of claim 2, wherein the tunable color filter is disposed between the microlens array and the lens system along the path of the light beam.

4. The system of claim 1, wherein the detector is a greyscale area scan camera.

5. The system of claim 1, wherein the lens system is an objective lens.

6. The system of claim 1, further comprising a beam splitter positioned in the path of the light beam between the tunable color filter and the lens system.

7. The system of claim 1, further comprising a tube lens positioned in the path of the light beam between the microlens array and the lens system.

8. The system of claim 1, wherein the tunable color filter is disposed between the broadband light source and the microlens array.

9. The system of claim 1, wherein the tunable color filter is disposed between the microlens array and the detector.

10. The system of claim 1, wherein a plurality of the tunable color filter is positioned in the path of the light beam.

11. The system of claim 1, wherein the tunable color filter is a liquid crystal tunable filter, an acousto optical tunable filter, or a tunable Fabry Perot etalon.

12. The system of claim 1, further comprising a processor in electronic communication with the detector, wherein the processor is configured to determine 3D measurements of features on the workpiece.

13. A method comprising:
    generating a light beam using a broadband light source;
    focusing, using a microlens array, the light beam into a plurality of points in a focal plane of the microlens array, wherein the microlens array is configured as a spatial filter;
    narrowing the light beam to a band at a central wavelength using a tunable color filter;
    imaging a plurality of points onto a workpiece using a lens system, wherein the lens system is configured to provide longitudinal chromatic aberration whereby different wavelengths are imaged at different distances from the lens system;
    passing the light beam reflected from the workpiece that is in focus at the workpiece using the microlens array; and
    receiving the light beam reflected from the workpiece at a detector.

14. The method of claim 13, further comprising determining 3D measurements of features on the workpiece using a processor.

15. The method of claim 14, further comprising:
    sweeping a narrow band from a low wavelength to a high wavelength; and
    determining a topography of the workpiece using the processor.

16. The method of claim 14, wherein the 3D measurements include one or more of ball height, co-planarity, component thickness, and warpage.

17. The method of claim 14, further comprising skipping part of the workpiece during the determining.

18. The method of claim 13, wherein only one or more features from the workpiece located at a selected Z-level are detected by the detector.

* * * * *